(12) United States Patent
Zhang et al.

(10) Patent No.: US 11,354,120 B1
(45) Date of Patent: Jun. 7, 2022

(54) MACHINE LEARNING-BASED SOFTWARE APPLICATION MODERNIZATION ASSESSMENTS

(71) Applicant: Amazon Technologies, Inc., Seattle, WA (US)

(72) Inventors: Jiangtao Zhang, Pleasanton, CA (US); Raviprasad V. Mummidi, Mountain View, CA (US); Ramu Panayappan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/894,518

(22) Filed: Jun. 5, 2020

(51) Int. Cl.
| | |
|---|---|
| *G06F 8/76* | (2018.01) |
| *G06F 8/72* | (2018.01) |
| *H04L 29/08* | (2006.01) |
| *G06N 5/04* | (2006.01) |
| *G06N 20/00* | (2019.01) |
| *H04L 67/00* | (2022.01) |
| *H04L 67/10* | (2022.01) |

(52) U.S. Cl.
CPC .................. *G06F 8/76* (2013.01); *G06F 8/72* (2013.01); *G06N 5/04* (2013.01); *G06N 20/00* (2019.01); *H04L 67/10* (2013.01); *H04L 67/34* (2013.01)

(58) Field of Classification Search
CPC ............. G06F 8/76; G06N 20/00; G06N 5/04
USPC ................................. 717/120–123, 168–178
See application file for complete search history.

(56) References Cited

U.S. PATENT DOCUMENTS

| | | | |
|---|---|---|---|
| 2005/0137932 A1 | 6/2005 | D'Angelo et al. | |
| 2007/0067756 A1* | 3/2007 | Garza | G06F 8/76 717/136 |
| 2011/0029946 A1* | 2/2011 | Joukov | G06F 8/70 717/100 |

(Continued)

OTHER PUBLICATIONS

Alonso, Juncal, et al. "Cloud modernization assessment framework: Analyzing the impact of a potential migration to Cloud." 2013 IEEE 7th International Symposium on the Maintenance and Evolution of Service-Oriented and Cloud-Based Systems. IEEE, 2013. pp.64-73 (Year: 2013).*

(Continued)

*Primary Examiner* — Satish Rampuria
(74) *Attorney, Agent, or Firm* — Nicholson De Vos Webster & Elliott LLP

(57) ABSTRACT

Techniques are described for enabling a software modernization assessment service to train and use ML models to automatically generate modernization assessment recommendations for users' software applications and systems. A modernization assessment service collects historical assessment data reflecting past modernization processes and assessments (e.g., application profile information and associated modernization strategies and tools used in past modernization projects). The modernization assessment service uses the historical assessment data to train one or more ML models (e.g., classifiers) that can be used to automatically identify relevant modernization strategies, services, and tools for given software application or system. Responsive to user requests to generate modernization assessment recommendations, the modernization assessment service can use the trained models to automatically generate modernization recommendations and reports.

20 Claims, 8 Drawing Sheets

(56) References Cited

U.S. PATENT DOCUMENTS

| | | | | |
|---|---|---|---|---|
| 2011/0055798 | A1* | 3/2011 | Kraft | G06F 11/3604 717/100 |
| 2011/0270857 | A1* | 11/2011 | Bommireddipalli | G06F 21/62 707/758 |
| 2011/0289479 | A1* | 11/2011 | Pletter | G06F 3/0481 717/122 |
| 2013/0346234 | A1* | 12/2013 | Hendrick | G06Q 30/02 705/26.7 |
| 2014/0007048 | A1* | 1/2014 | Qureshi | G06F 21/53 717/110 |
| 2017/0212748 | A1 | 7/2017 | Agnew et al. | |
| 2017/0270432 | A1* | 9/2017 | Sachdev | H04L 41/147 |
| 2021/0279066 | A1 | 9/2021 | Xiao et al. | |

OTHER PUBLICATIONS

Knoche, Holger, and Wilhelm Hasselbring. "Using microservices for legacy software modernization." IEEE Software 35.3 (2018): pp. 44-49. (Year: 2018).*

Chiang, Chia-Chu, and Coskun Bayrak. "Legacy software modernization." 2006 IEEE international conference on systems, man and cybernetics. vol. 2. IEEE, 2006.pp. 1304-1309 (Year: 2006).*

Izquierdo, Javier Luis Cánovas, and Jesús García Molina. "Extracting models from source code in software modernization." Software & Systems Modeling 13.2 (2014): pp. 713-734. (Year: 2014).*

Bezivin, Jean. "Model Engineering for Software Modernization." WCRE. 2004.pp.1-137 (Year: 2004).*

Iosif-Lazar, Alexandru F., et al. "Experiences from designing and validating a software modernization transformation (E)." 2015 30th IEEE/ACM International Conference on Automated Software Engineering (ASE). IEEE, 2015.pp. 597-607 (Year: 2015).*

Pereira, Renato F., Cláudio MS Medeiros, and Pedro P. Reboças Filho. "Goat leather quality classification using computer vision and machine learning." 2018 International Joint Conference on Neural Networks (IJCNN). IEEE, 2018. pp. 1-8 (Year: 2018).*

Neely, J. Robert, and Bronis R. De Supinski. "Application modernization at LLNL and the Sierra Center of Excellence." Computing in Science & Engineering 19.5 (2017): pp. 9-18. (Year: 2017).*

Nooshabadi, Saeid, and Jim Garside. "Modernization of teaching in embedded systems design—an international collaborative project." IEEE Transactions on Education 49.2 (2006): pp. 254-262. (Year: 2006).*

Non-Final Office Action, U.S. Appl. No. 16/894,521 dated Oct. 5, 2021, 22 pages.

Puri, Ruchir et al., Accelerate innovation with AI for app modernization, May 5, 2020, 6 pages, https://www.ibm.com/blogs/journey-to-ai/2020/05/accelerate-innovation-with-ai-for-app-modernization/, Jan. 7, 2022.

* cited by examiner

MACHINE LEARNING-BASED SOFTWARE APPLICATION MODERNIZATION ASSESSMENTS

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
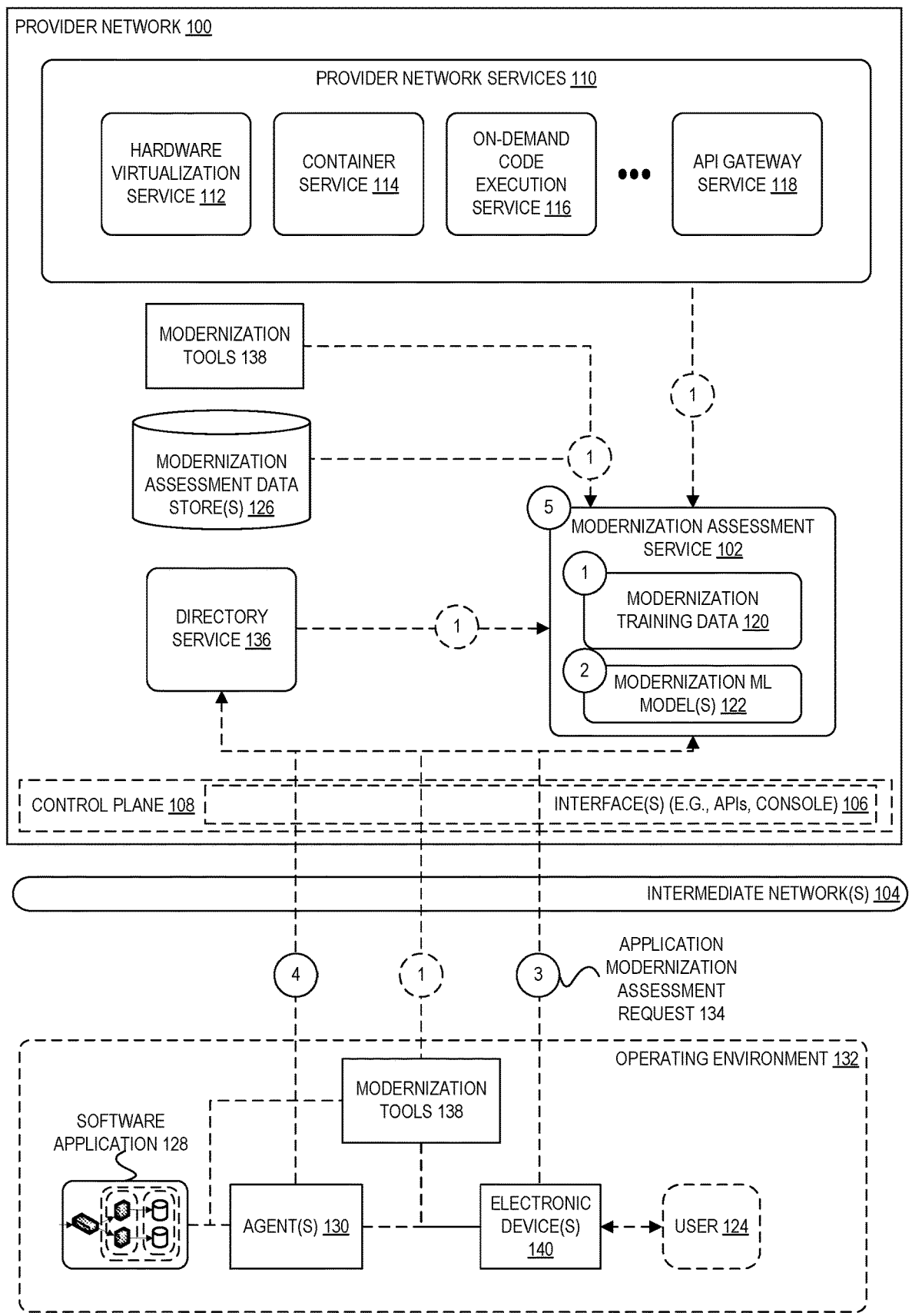
FIG. 1 is a diagram illustrating an environment that enables a software modernization assessment service of a cloud provider network to train and use machine learning (ML) models to automatically generate modernization assessment recommendations and reports for users' software applications according to some embodiments.

The present disclosure relates to methods, apparatus, systems, and non-transitory computer-readable storage media for enabling a software modernization assessment service of a cloud provider network to train and use ML models to automatically generate modernization assessment recommendations for users' software applications and systems. According to some embodiments, a modernization assessment service collects modernization training data reflecting metrics and other data derived from past software application and system modernization processes, assessments, and tools. The modernization training data can include, for example, software application and system profile information (e.g., related to software applications or systems modernized in the past) and the associated modernization strategies, cloud provider services, and other tools used to modernize each of the applications and system. In some embodiments, a modernization assessment service uses modernization training data to train one or more ML models (e.g., classifiers that can be used to automatically identify relevant modernization strategies, services, and tools for given software applications or systems). The modernization assessment service can then use the trained ML models to automatically obtain modernization recommendations for various application components and development patterns (e.g., by using obtained profile data for the application as input to the models) and to further generate automated modernization assessment reports responsive to user requests for such information.

Software modernization broadly refers to converting, rewriting, or porting legacy software applications or systems to more modern computer programming languages, software libraries, protocols, hardware platform, application architectures, cloud-based services, and the like. Users, business organizations, and other entities may often desire to modernize their various software applications and systems to improve operational performance and increase application availability, to reduce exposure to vulnerabilities (e.g., software crashes, security vulnerabilities, etc.), to enable more efficient ongoing development of the applications, among other possible reasons.

Existing processes for modernizing software applications and systems are often labor intensive, time intensive, and error prone. A software modernization project, for example, typically involves many different parties, including various software engineers, system administrators, modernization experts, and so forth, to collect the information needed to make modernization recommendations and decisions. The modernization assessments, recommendations, and decisions made by such parties are often based largely on the personal experience of the various individuals involved in the process, where such recommendations may at times be driven by external factors unrelated to the technical details at hand and generally need to be repeated independently for each application or system to be modernized. Furthermore, a large portion of applications running in data centers are often not owned by the users desiring to modernize their systems; instead, many user applications are commercial software, increasing the difficulty to make proper modernization assessments and recommendations in many cases.

The aforementioned challenges, among others, are addressed by a modernization assessment service of a cloud provider network that can automate many aspects of the software modernization processes described above. As indicated, in some embodiments, a modernization assessment service trains and uses ML models to enable automated modernization assessments and recommendations based on metrics and other data derived from best practices and past experiences. For example, using input identifying attributes of users' applications to be modernized, the service is able to use such ML models to identify modernization strategies and modernization tools well-suited for use in modernizing the identified applications. Among other benefits, the modernization assessment service described herein provides assessments and strategy recommendations that are more objective, consistent, and error free, thereby leading to software applications with improved performance and that make more efficient use of available computing resources.

FIG. 1 is a diagram illustrating an environment that enables a software modernization assessment service 102 of a cloud provider network 100 to train and use machine learning (ML) models to automatically generate modernization assessment recommendations and reports for users' software applications according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internet) via one or more interface(s) 106, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 106 may be part of, or serve as a front-end to, a control plane 108 of the provider network 100 that includes "backend" services supporting and enabling the services that may be more directly offered to customers.

For example, a cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a provider network service 110 such as hardware virtualization service 112) hosted by the provider network to perform a variety of computing tasks. Additionally, or alternatively, a user may indirectly utilize a compute instance by submitting code to be executed by the provider network (e.g., via an on-demand code execution service 116), which in turn utilizes a compute instance to execute the code—typically without the user having any control of or knowledge of the underlying compute instance(s) involved.

The on-demand code execution service 116 (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service 116 by uploading their code and using one or more APIs to request that the service 116 identify, provision, and manage any resources required to run the code.

For example, in various embodiments, a "serverless" function may include code provided by a user or other entity—such as the provider network itself—that can be executed on demand. Serverless functions may be maintained within provider network 100 by an on-demand code execution service 116 and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The hardware virtualization service 112 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, a container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In FIG. 1, the circles numbered "1"-"5" illustrate an example process that includes a modernization assessment service 102 collecting modernization training data 120 from various sources, using the modernization training data 120 to train one or more ML models 122, and enabling users to obtain automated modernization assessment recommendations and reports for users' software applications and systems using the trained ML models 122. Although the example illustrated in FIG. 1 is presented in the context of a modernization assessment service 102 of a cloud provider network 100, similar techniques can be used in other computing environments.

The ML models 122 can be any suitable model for a particular modernization recommendation task, including a neural network, support vector machines, linear or logistic regression, random forests, decision trees, or other suitable models. The ML models 122 can include individual models or ensembles of models. Such models include parameters (e.g., for a neural network, weights of connections between nodes in different layers) that are learned from data during the training process in which the parameters are tuned to produce expected outputs given corresponding inputs in training data. Thus, a ML model is an adaptive system that is configured to change its structure (e.g., connection configuration and/or weights) based on information that flows through the model during training, and the learned parameters of the hidden layers can be considered as an encoding of meaningful patterns in the data. It will be appreciated that during inference (the phase of machine learning in which a trained model is used to make recommendations or predictions based on new input data), these learned parameters and the structure (e.g., flow of information, computations) of the model are stored in computer hardware (e.g. disk or memory) and then executed by one or more processors.

In some embodiments, at circle "1," the modernization assessment service 102 collects, from various data sources, modernization training data 120 to be used to train one or more ML models 122. In general, the modernization training data 120 includes various types of metrics, logs, and other data related to past efforts to modernize various types of software applications and systems associated with various users. In some embodiments, the types of historical modernization data 120 can include data manually recorded by software modernization teams during past manual modernization projects (e.g., modernization spreadsheets and other data stored in one or more modernization data stores 126), data generated by various software agents and modernization tools 138 used to carry out modernization processes (e.g., including standalone modernization tools 138 running on-premises and provided by the cloud provider or a third party entity, or modernization tools 138 running as a service of the provider network 100, where such modernization tools 138 may be used to help users analyze application codebases, collect dynamic application performance information, perform or assist with modernization operations such as application migration, rehosting, refactoring, etc.), data generated by various applications and cloud provider services used to modernize applications (e.g., resource migration services, hardware virtualization services, etc.), and the like. In some embodiments, the information included in the modernization training data 120 can include, but is not limited to, types of software applications and systems that have previously undergone modernization processes, types of computing environments in which such applications and systems were located, information about the applications' technical stacks, programming languages, application scales, dynamic and static performance information (e.g., including runtime configuration information, memory usage, CPU usage, runtime libraries used, etc.), identified development patterns and anti-patterns, information about communication methods and patterns between application components (e.g., network protocols used, communication paths, etc.), and so forth. The modernization training data 120 can further indicate types of modernization strategies, cloud provider services, and other tools used to modernize some or all of the identified applications or systems and components thereof.

Figure 2:
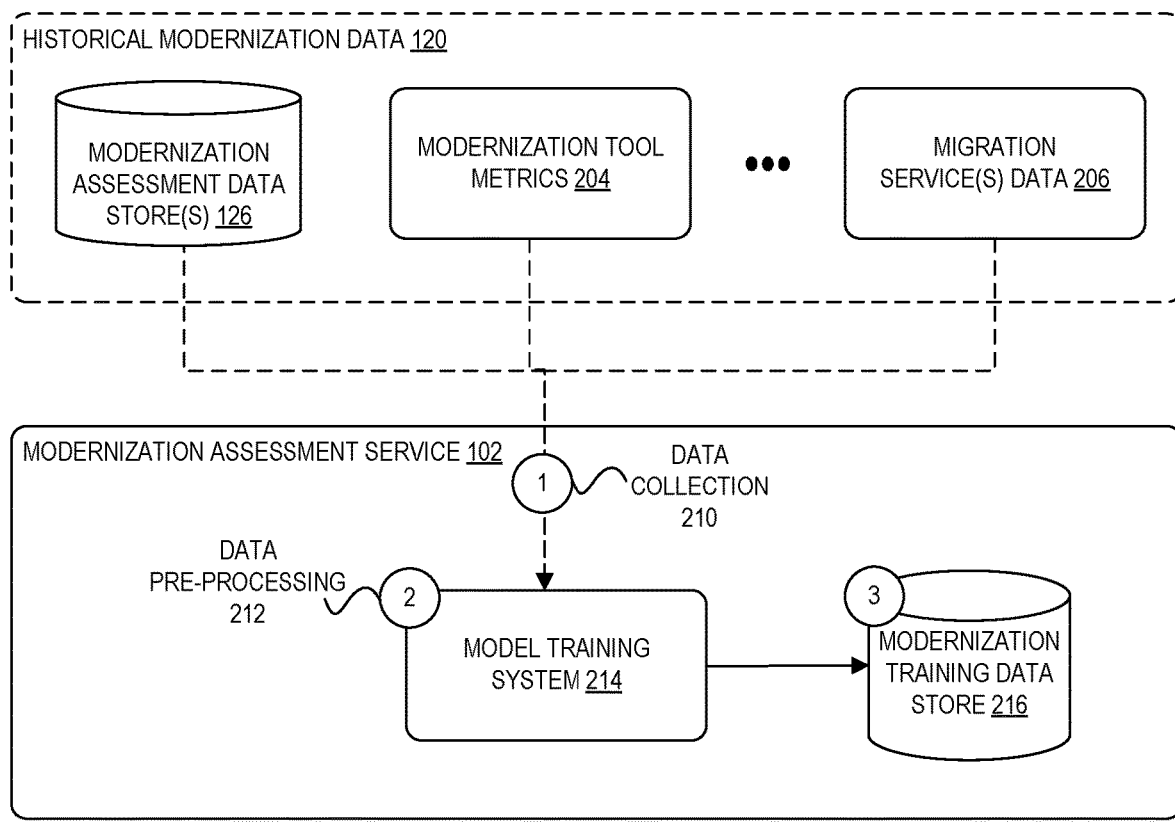
FIG. 2 is a diagram illustrating the collection of modernization training data used to train modernization assessment ML models according to some embodiments.

FIG. 2 is a diagram illustrating the collection of modernization training data used to train modernization assessment ML models according to some embodiments. As indicated above, a modernization assessment service 102 can collect historical software modernization assessment data from a number of independent and dissimilar data sources. As shown in FIG. 2, the modernization training data 120 can include, for example, modernization team-generated data (e.g., including spreadsheets and other types of data), modernization tool metrics 204, migration service(s) data 206, application data obtained from a directory service 136, among other possible types of modernization training data.

In some embodiments, at circle "1" in FIG. 2, the modernization assessment service 102 collects 210 the modernization training data 120. The data may be collected in a number of ways including, for example, users uploading, importing, or otherwise storing the data in association with the service 102, the service 102 obtaining or ingesting the data from various software agents, applications, or services internal or external the provider network 100, or users generating the modernization training data 120 using the modernization assessment service 102. In some embodiments, the data collection 210 process can occur over any period of time and the collected data can be continually updated as new data becomes available to the service 102 (e.g., based on receiving data streamed to the service 102 over time).

In some embodiments, at circle "2," a model training system 214 or other component of the service 102 optionally performs various data pre-processing operations 212 on the modernization training data 120. In some embodiments, the pre-processing operations can include organizing the data in various ways (e.g., aggregating data stored in similar formats; aggregating data related to particular application components such as web servers, application servers, database servers, standalone applications, etc.; aggregating data related to particular modernization strategies, services, and tools, etc.), and so forth. In some embodiments, the data pre-processing 212 can further include cleaning or transforming the data, deduplicating data entries, or any other operations to aid in the model training processes.

In some embodiments, modernization training data 120 can include a wide variety of information related to past modernization processes including, but not limited to: an operating system (OS) type and OS versions of applications modernized; an application inventory; application classifications; a type of business with which the applications were associated; a data center location (e.g., on-premises or in a cloud); an application type; a retirement date; technical stack details (e.g., a programming language, source code complexity, refactoring efforts, frameworks, application server type and version, web server type and version, database type and version, configurations, architecture (e.g., monolithic, distributed, 2-tier, 3-tier, microservice, API, etc.). The collected information can further include information related to a scale of the applications including, for example, a number of servers, whether there is a load balancer, an amount of data storage, an amount of source code, an important of the application or system, dependencies with internal components (e.g., third party software and libraries, files, other operating environments), relationships with external components (e.g., network connections, IPC, RPC, etc.), DevOps efforts, service map, data flow, and volume, etc.

As indicated above, in some embodiments, one example source of modernization training data 120 includes modernization team-generated data. A modernization team, for example, supports users and organizations desiring to modernize their software applications and systems. These teams often collect large amounts of data during the modernization processes reflecting the types of data indicated above (e.g., type of applications modernized, type of associated programming techniques and stacks, types of programming language, architecture, etc., and types of modernization strategies and tools used in each case). In some embodiments, the modernization training data 120 optionally includes data derived from services and tools used to implement modernization strategies and techniques (e.g., containerization tool, re-platforming tools, OS and platform modernization tools, managed migration services, etc.). Containerization can refer to the conversion of a non-container-based application or workload into a container-based application or workload.

In some embodiments, at circle "3" in FIG. 2, the optionally preprocessed data is stored in a modernization training data store 216. In some embodiments, the modernization training data store 216 can be any type of data storage managed either by the modernization assessment service 102 or by another service or application accessible to the modernization assessment service (e.g., by an object storage service of the provider network 100).

Returning to FIG. 1, in some embodiments, at circle "2," the modernization assessment service 102 uses the obtained and optionally pre-processed modernization training data 120 to train one or more ML models 122. At a high level, the decisions made and processes performed during past software modernization assessment processes can be modeled using one or more classifiers, where application modernization strategies and tools are the classes to be categorized and the attributes of the corresponding software applications correspond to the models' features. In some embodiments, multiple one-class classifiers are trained for various different types of application components (e.g., web servers, application servers, database servers, standalone applications, etc.) and for various modernization tools and strategies, where such classifiers can be used to identify whether new instances (e.g., an application or application component to be modernized) are part of a single class (e.g., a good candidate for use of a particular modernization strategy or tool). In other embodiments, one or more binary or multi-class classifiers are trained and can be applied to various application components to produce one or more labels (e.g., corresponding to modernization tools and strategies). As described in more detail hereinafter, the models trained using the modernization training data can be used to generate modernization recommendations for one or more components of other applications to be modernized (e.g., a three-tier application including a web server, application server, and database server can receive separate recommendations for each application component and an overall recommendation for the application as a whole, etc.).

Figure 3:
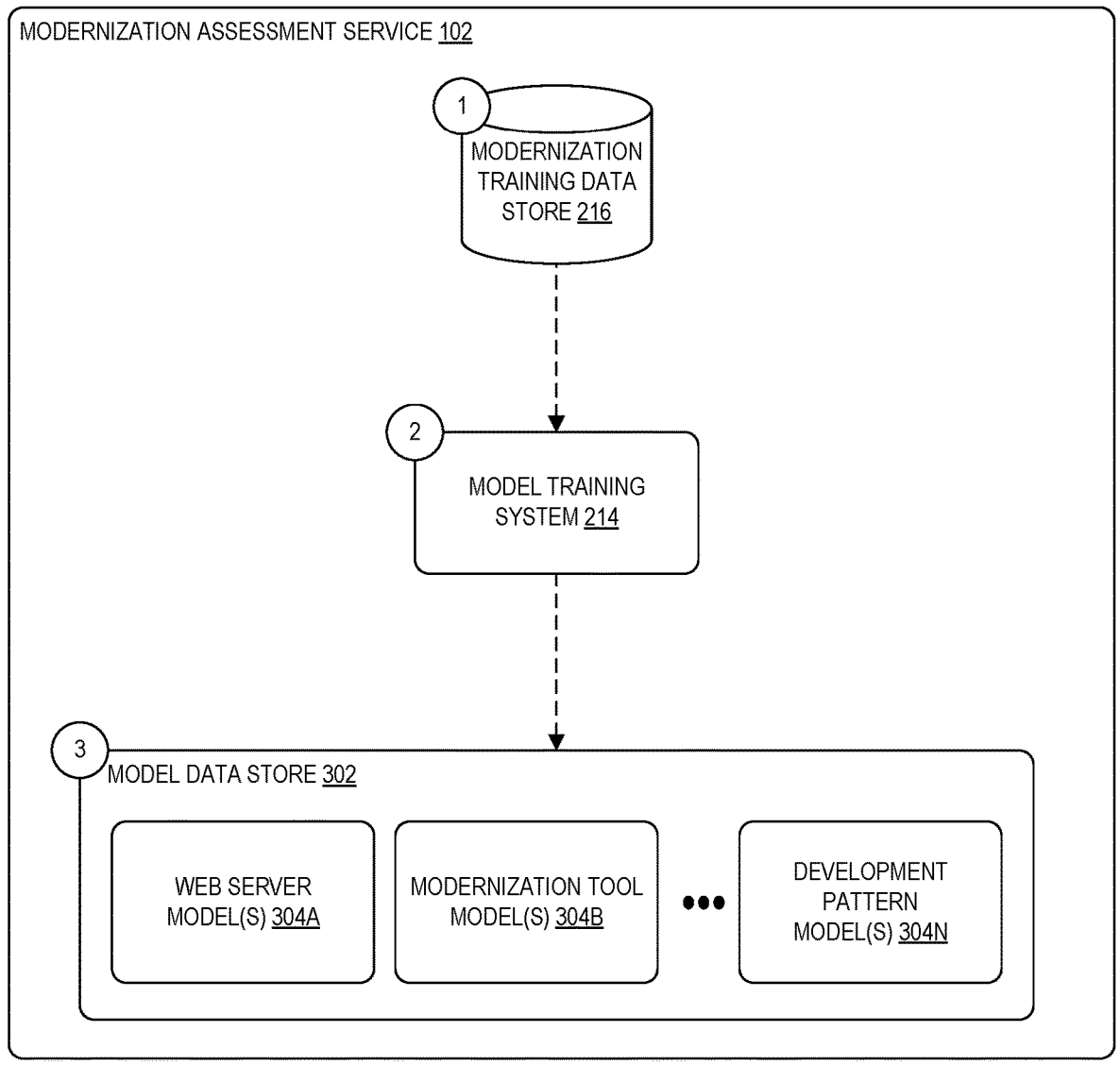
FIG. 3 is a diagram illustrating the use of a model training system to train modernization assessment models for various types of software application components, modernization strategies, and modernization services and tools according to some embodiments.

FIG. 3 is a diagram illustrating the use of a model training system to train modernization assessment models for various types of software application components, modernization strategies, and modernization services and tools according to some embodiments. In some embodiments, at circle "1" in FIG. 3, the model training system 214 obtains data from the modernization training data store 216 to be used to train one or more ML models 304. A ML model, generally, may be thought of as one or more equations that are "trained" using a set of data. In some embodiments, the training data provided to the model training system 214 may be in any of a number of machine-readable file formats, such as eXtensible Markup Language (XML) or JavaScript Object Notation (JSON).

In some embodiments, users can interact with the model training system 214 via a frontend of the model training system 214. For example, a user device can provide a training request that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, a container image can include one or more layers, where each layer represents an executable instruction. Some or all of the executable instructions together represent an algorithm that defines a ML model. The executable instructions (for example, the algorithm) can be written in any programming language (for example, Python, Ruby, C++, Java, etc.). In some embodiments, the algorithm is pre-generated and obtained by a user, via the user device, from an algorithm repository. In some embodiments, the algorithm is completely user-generated or partially user-generated (for example, user-provided code modifies or configures existing algorithmic code).

In some embodiments, instead of providing a container image (or identifier thereof), the user device may provide an algorithm written in any programming language. The model training system 214 may then package the algorithm into a container (optionally with other code, such as a "base" ML algorithm supplemented with user-provided code) that is eventually loaded into a virtual machine instance for training a machine learning model. In some embodiments, the model training system 214 can handle the acquisition and configuration of compute capacity (for example, containers, instances, etc., which are described in greater detail below) based on the information describing the computing machine on which to train a ML model provided by the user device. The model training system 214 can then train ML models using the compute capacity, as is described in greater detail below.

To perform the ML model training, in some embodiments, computing resources execute instructions according to hyperparameter values included in the training request. As an illustrative example, a model training system 214 trains a ML model by identifying values for certain parameters (for example, coefficients, weights, centroids, etc.). The identified values depend on hyperparameters that define how the training is performed. Thus, the computing resources can execute the executable instructions to initiate a ML model training process, where the training process is run using the hyperparameter values included in the training request. Execution can include applying the obtained training data as input parameters to some or all of the instructions being executed.

In some embodiments, the model training processes generate model data. The model data may be stored, for example, in one or more data files in a model data store 302 and can include characteristics of the ML model being trained, such as a number of layers in the machine learning model, hyperparameters of the machine learning model, coefficients of the machine learning model, weights of the machine learning model, and/or the like. In particular, the generated model data includes values for the characteristics that define the ML model being trained.

In some embodiments, the modernization assessment service 102 further includes a model execution system (e.g., model execution system 402 shown in FIG. 4, which may be part of or separate from the model training system 214), including a single physical computing device or multiple physical computing devices that are interconnected using one or more computing networks (not shown), where the physical computing device(s) host one or more virtual machine instances. The model execution system 402 can handle the acquisition and configuration of compute capacity (for example, containers, instances, etc.) based on requests to execute trained ML models. The model execution system 402 can then execute ML models using the compute capacity.

In some embodiments, a request to execute a ML model is transmitted to the model execution system 402, where the request includes an input to a ML model (for example, a set of input data). The model execution system 402 or another system executes the code in response to receiving the execution request. In particular, execution of the code causes the executable instructions in the code corresponding to the algorithm to read the model data file (e.g., model data obtained from the model data store 302), use the input included in the execution request as an input parameter, and generate a corresponding output. As an illustrative example, the algorithm can include coefficients, weights, layers, cluster centroids, and/or the like. The executable instructions in the code corresponding to the algorithm can read the model data file to determine values for the coefficients, weights, layers, cluster centroids, and/or the like. The executable instructions can include input parameters, and the input included in the execution request can be supplied as the input parameters. With the ML model characteristics and the input parameters provided, execution of the executable instructions can be completed resulting in an output. In some embodiments, the output is stored in a data store. Alternatively or in addition, the model execution system 402 transmits the output to a user device that submitted the execution request. In some embodiments, the operating environment supports many different types of machine learning models, such as classification models, multi arm bandit models, reinforcement learning models, ensemble machine learning models, deep learning models, and/or the like.

Returning to FIG. 1, in some embodiments, at circle "3," a user 124 uses an electronic device 140 to send an application modernization assessment request 134 to the modernization assessment service 102. For example, the user 124 may be associated with an operating environment 132 in which a software application 128 is located (e.g., which may be located within an on-premises network, within the provider network 100, within a separate provider network, etc.) and the user may desire to modernize one or more components of the software application 128. In some embodiments, communications between electronic device(s) 140 and the cloud provider network 100 can be routed through interface(s) 106, such as through use of API calls, via a console implemented by the cloud provider network 100 as a website or using a command-line application, and so forth. In some embodiments, the request 134 to obtain a modernization assessment is directed by the control plane 108 to the modernization assessment service 102. In some embodiments, the request 134 identifies the application for which the modernization assessment is to be generated, e.g., by selecting the software application from a list of applications known to the service 102 or by otherwise identifying the application and its location. Although the modernization assessment service 102 is depicted as a service of the cloud provider network 100 in FIG. 1, in some embodiments, the modernization assessment service is implemented as a standalone application or service that can be executed in other environments such as users' on-premises networks.

In some embodiments, at circle "4" in FIG. 1, the modernization assessment service 102 obtains profile data for the identified software application and, at circle "5," generates an automated modernization assessment (e.g., including one or more modernization recommendations) responsive to the request 134. In some embodiments, the modernization assessment service 102 begins the automated modernization assessment by obtaining application profile data for the application 128 to be modernized. In some embodiments, the obtained profile data can be collected from one or more sources including, for example, various agent(s) 130 coupled to the software application 128, a directory service 136, other cloud provider network services 110, based on user input, etc. In some embodiments, some or all of the data sources and application information can be provided by a user as part of the request 134 or as part of a separate request providing information about the software application 128 to be modernized.

As indicated above, in some embodiments, the application profile data may include information collected by various types of software agents associated with the application 128. An agent 130, for example, can be provided by the modernization assessment service 102, by other cloud provider network 100 services, by various third parties, or any other entities. In some embodiments, an agent 130 performs various analyses of the software application 128 including, for example, an analysis of the application's source code, an executable binary of the application, associated hardware and infrastructure, etc. In some embodiments, the analysis of a software application 128 includes the identification of various types of development patterns and anti-patterns associated with the application (.g., determining that the source code uses fixed IP addresses rather than dynamic IP addresses, fixed port numbers, local file system access, local storage clusters, etc.). In some embodiments, an agent 130 can also perform various types of dynamic analysis to identify information about an application's execution environment, network connectivity, software and service dependencies, application versions, etc.

In some embodiments, agents 130 and other components can send data related to the application 128 to the modernization assessment service 102 via one or more APIs provided by the service 102. The collected data can then be used as part of the input to the ML models 122 to identify one or more recommended modernization strategies and tools, as described in more detail below.

Figure 4:
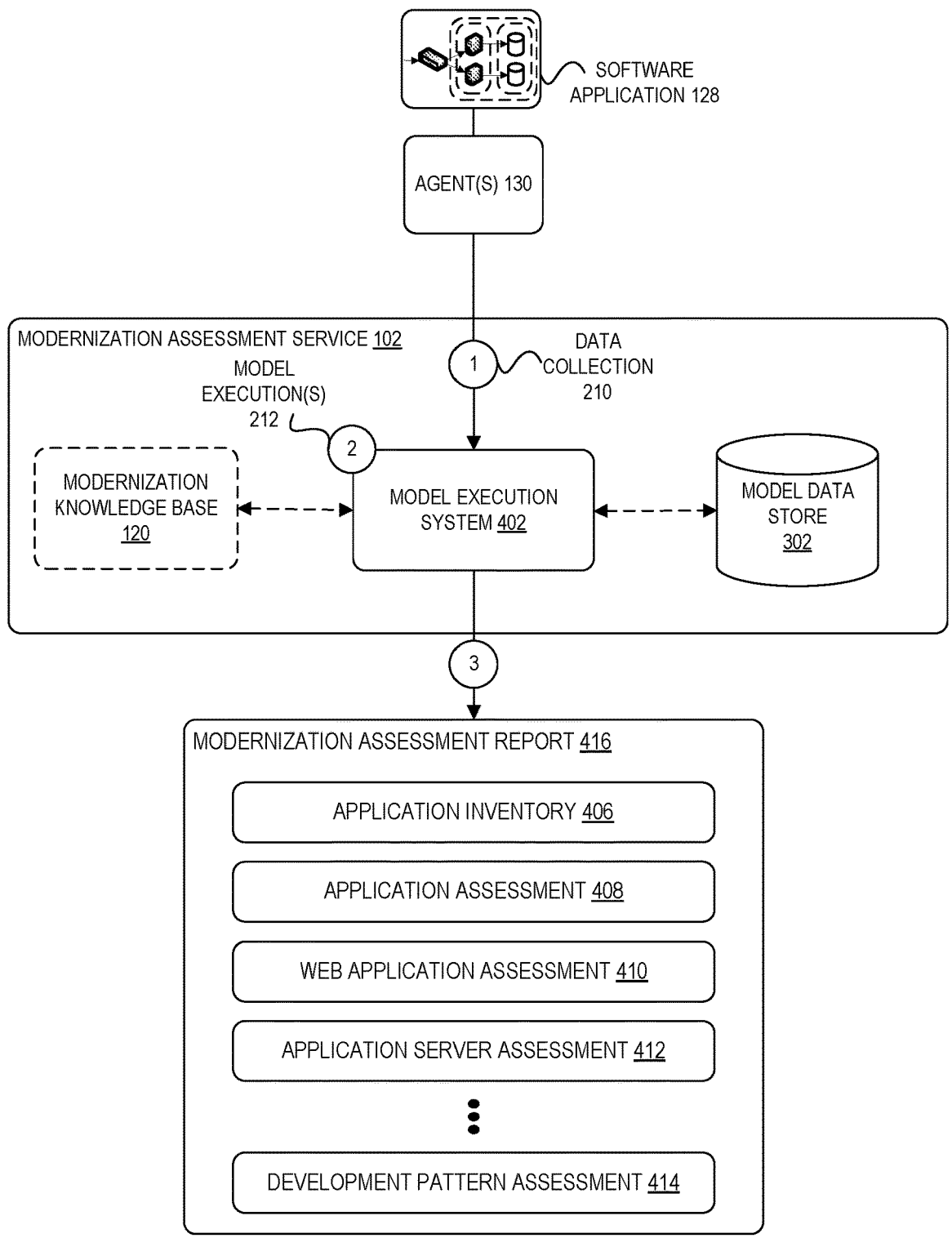
FIG. 4 is a diagram illustrating the use of trained modernization assessment ML models to obtain modernization recommendations for users' software applications and systems according to some embodiments.

FIG. 4 is a diagram illustrating the use of trained modernization assessment ML models to obtain modernization recommendations for users' software applications and systems according to some embodiments. At circle "1" in FIG. 4, application profile data related to a software application 128 to be modernized is collected and provided to the modernization assessment service 102 as described elsewhere herein. In some embodiments, at circle "2," a model execution system 402 optionally processes the data and uses the data as input to one or more ML models stored in the model data store 302.

In some embodiments, at circle "3," the modernization assessment service 102 uses the trained ML models to obtain one or more modernization recommendations and optionally generates a modernization assessment report 416. In some embodiments, the modernization assessment report 416 is displayed in a web-based portal, made available for download by the requesting user, automatically sent to a device associated with the requesting user, or otherwise provided by the modernization assessment service 102 to the requesting user. Possible recommended modernization strategies included in the report include, but are not limited to, rehosting (e.g., "lift-and-shift" migration, wherein an on-premises based application is moved from on-premises infrastructure to cloud provider infrastructure, e.g., using resources provided by a hardware virtualization service 112); refactoring (e.g., wherein a codebase is updated for portability, containerization using a container service 114, or other updates); re-architecting (e.g., decomposing a monolithic application into a collection of microservices that can be built, deployed, and managed independently, or converting an application into a serverless architecture with an on-demand code execution service 116 and API gateway service 118; converting an application designed using a middleware pattern using specified provider network services, etc.); rebuilding the application (e.g., a complete rebuilding using cloud native applications and services); replace the application (retire the legacy application completely and replace it with a cloud based solution), and so forth.

As indicated above, in some embodiments, a modernization assessment service 102 trains separate models for various types of application components (e.g., web servers, application servers, database servers, etc.) and for various types of modernization strategies, services, and tools. In some embodiments, a corresponding modernization assessment report 416 may thus include assessments each separate component of a software application (e.g., a web application assessment 410, an application server assessment 412, a development pattern assessment 414, e.g., based on one or more development patterns or identified anti-patterns, etc.), assuming the application includes multiple components or other characteristics, and may further include one or more comprehensive assessments and recommendations for the application (e.g., an application assessment 408). For example, considering an example application that includes a web server, application server, and database server, separate recommendations can be provided for each of the separate components (e.g., a recommendation to re-host the web server using a particular provider network service, a recommendation to refactor the application server using a containerization strategy, a recommendation to migrate the database server to one of a plurality of recommended database services provided by the provider network 100, etc.).

In some embodiments, a modernization assessment report 416 can include information in addition to the recommendations obtained from the ML models such as, for example, static and dynamic analysis results generated by various agents, other assessment information obtained from other tools and services, information about an anticipated cost to implement various modernization strategies or tools, and the like.

In some embodiments, the modernization assessment service 102 maintains an inventory of a user's software applications and generated assessments, which can be displayed as part of a modernization assessment report 404 as application inventory 406. For example, a user use various interfaces of the modernization assessment service 102 to view applications known to the service and to view a history of assessments generated for the various applications, where a user can update information for the saved applications and optionally re-run one or more of the assessments over time, if desired. In some embodiments, the modernization assessment service 102 obtains feedback data indicating whether a user associated with the software application implemented one or more the modernization recommendations. In some embodiments, the feedback data can be used to further train the ML models.

In some embodiments, the modernization assessment service 102 receives input selecting a modernization recommendation contained in the report, and automatically creates a computing resource at a service of a cloud provider network, wherein the computing resource is used to implement the modernization recommendation. For example, service 102 may create one or more VM instances, containers, data storage resources, or any other type of computing resource that can be used to carry out a modernization recommendation, such as migrating, rehosting, or refactoring a software application to take advantage of various cloud provider services and resources.

Figure 5:
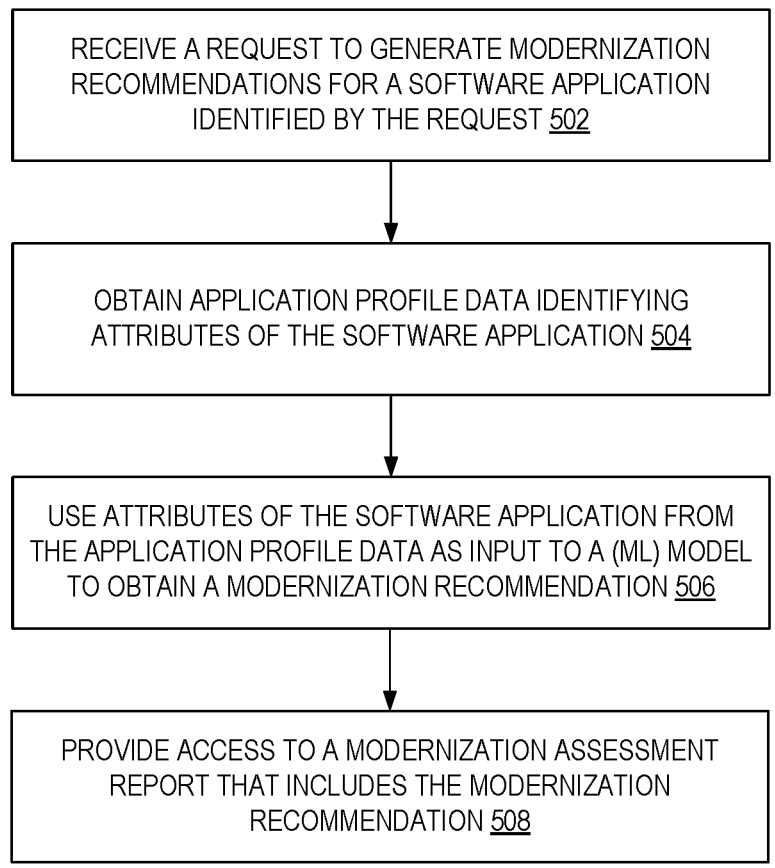
FIG. 5 is a flow diagram illustrating operations of a method for using trained modernization assessment ML models to obtain modernization recommendations for users' software applications and systems according to some embodiments.

FIG. 5 is a flow diagram illustrating operations 500 of a method for using trained modernization assessment ML models to obtain modernization recommendations for users' software applications and systems according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a modernization assessment service 102 of the other figures.

The operations 500 include, at block 502, receiving a request to generate modernization recommendations for a software application identified by the request.

The operations 500 further include, at block 504, obtaining application profile data identifying attributes of the software application.

The operations 500 further include, at block 506, using attributes of the software application from the application profile data as input to a (ML) model to obtain a modernization recommendation.

The operations 500 further include, at block 508, providing access to a modernization assessment report that includes the modernization recommendation.

In some embodiments, the operations further include identifying a plurality of components of the software application, wherein each component of the plurality of components is associated with respective attributes in the profile data; and for each component of the plurality of components, using the respective attributes of the component as input to a respective ML model to generate a respective modernization recommendation, wherein the modernization assessment report includes the respective modernization recommendation for each component of the plurality of components.

In some embodiments, the operations further include obtaining modernization training data including profile data for a plurality of software applications modernized in the past and metrics derived from a modernization tool used to modernize the plurality of software applications; and using the modernization training data to train the ML model.

In some embodiments, the modernization recommendation identifies at least one of: migrating one or more components of the software application to resources provided by a service of a cloud provider network, refactoring source code associated with the software application, rearchitecting one or more components of the software application, rebuilding the software application, or using a modernization application tool.

In some embodiments, the operations further include receiving input selecting the modernization recommendation; and creating a computing resource at a service of a cloud provider network, wherein the computing resource is used to implement the modernization recommendation.

In some embodiments, the operations further include causing display, by a modernization assessment service of a cloud provider network, of a web-based console including the modernization assessment report.

In some embodiments, the application profile data identifies at least one of: a type of the software application, a type of computing environments in which the software application is located, the software application's technical stack, a programming language associated with the software application, application scaling information, dynamic performance information associated with the software application, or identified anti-patterns associated with the software application.

In some embodiments, at least a portion of the application profile data is obtained from a software agent running in a user's computing environment in which the software application is located, wherein the software agent collects the at least a portion of the application profile data by analyzing the software application.

In some embodiments, the operations further include obtaining feedback data indicating whether a user associated with the software application implemented the modernization recommendation; and using the feedback data to further train the ML model.

In some embodiments, the request to generate the modernization recommendations for the software application is received by a modernization assessment service of a cloud provider network, and wherein the modernization assessment service obtains the modernization recommendation using the ML model.

In some embodiments, the ML model is a one-class or binary classifier used to identify whether the software application is similar to other software applications that used the modernization recommendation in the past.

Figure 6:
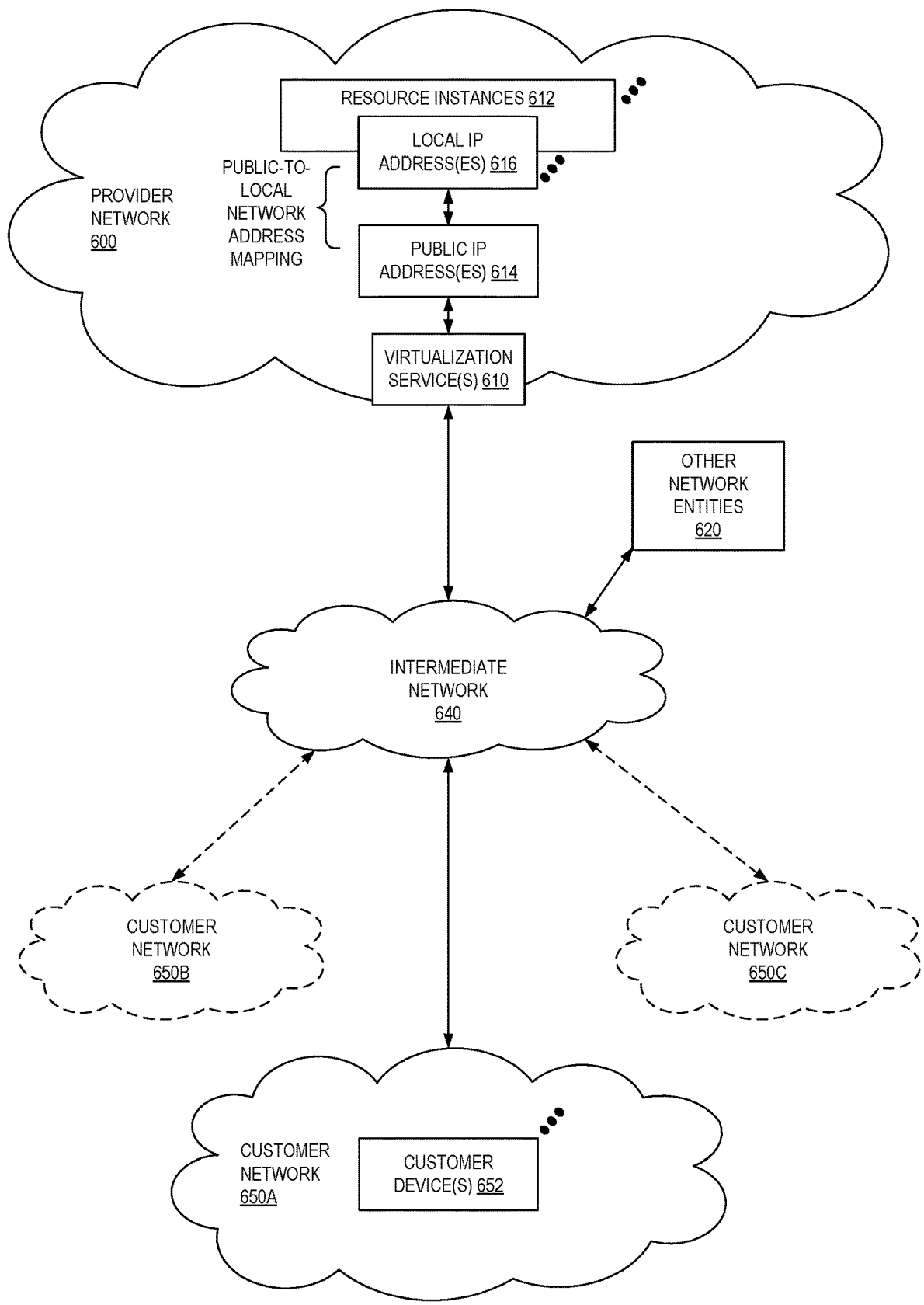
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
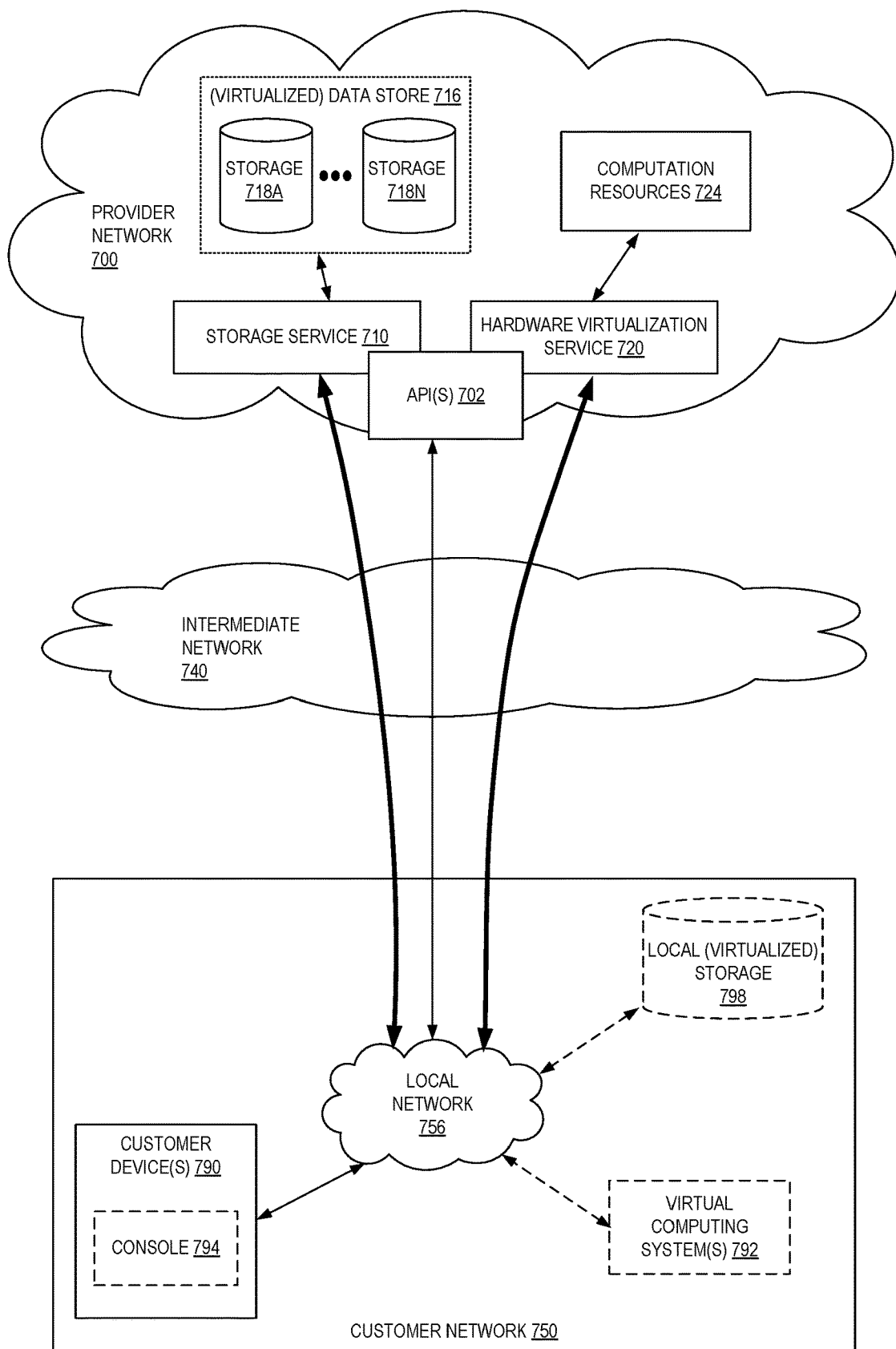
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
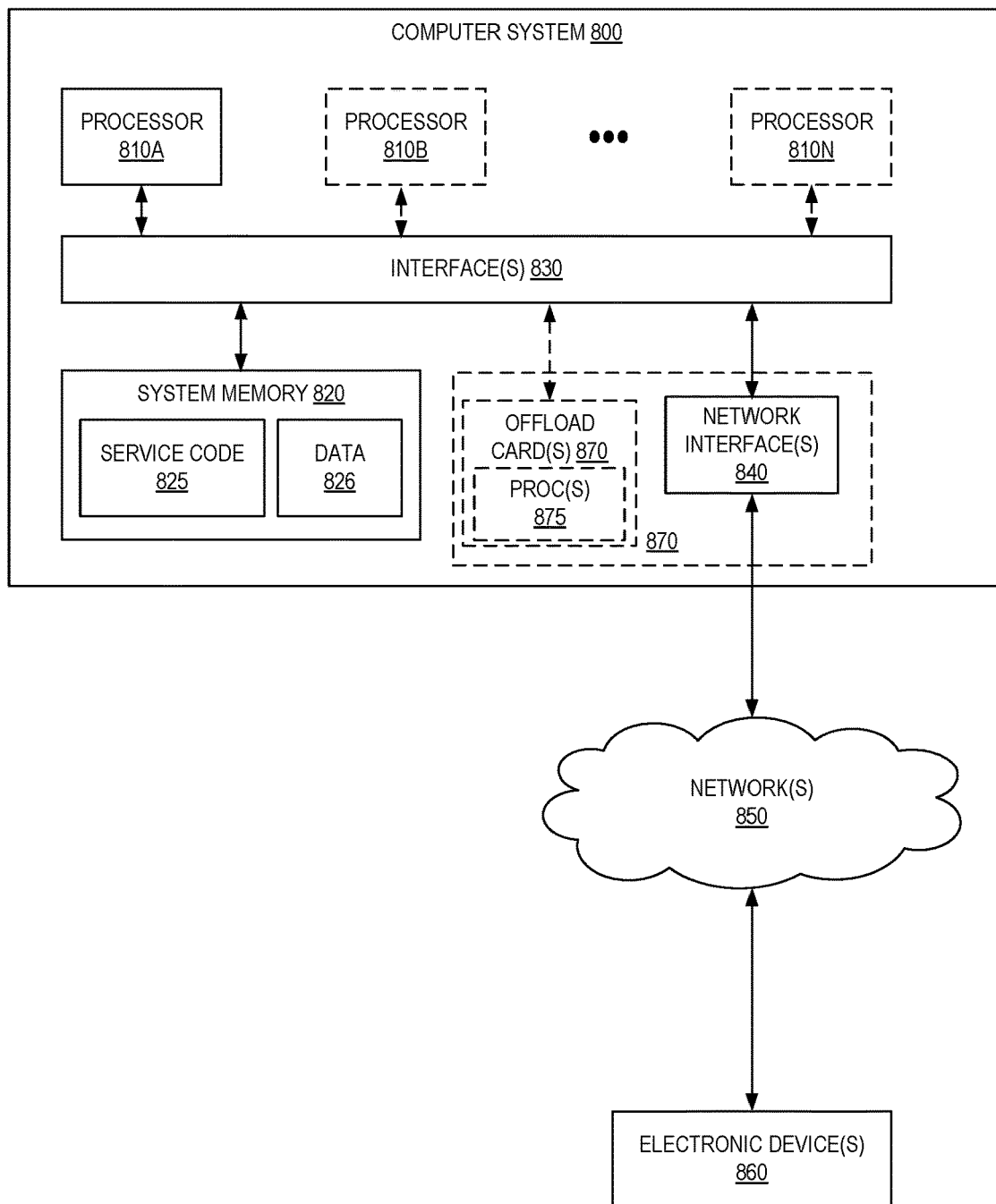
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by software modernization assessment service of a cloud provider network, a request to generate a modernization recommendation for a software application identified by the request;
obtaining application profile data identifying attributes of the software application;
identifying a component of the software application for which the modernization recommendation is to be generated;
using attributes of the component from the application profile data as input to a machine learning (ML) model to obtain the modernization recommendation, wherein the modernization recommendation identifies at least one of: a technique for modernizing the component of the software application, or a service of the cloud provider network that can be used to modernize the component of the software application;
providing access to a modernization assessment report that includes the modernization recommendation; and
receiving input selecting the modernization recommendation for implementation, wherein the input causes the software modernization assessment service to:
create a computing resource at a service of a cloud provider network based on the modernization recommendation, and
migrate implementation of the component of the software application to the computing resource.

2. The computer-implemented method of claim 1, further comprising:
identifying a plurality of components of the software application, wherein each component of the plurality of components is associated with respective attributes in the profile data; and
for each component of the plurality of components, using the respective attributes of the component as input to a respective ML model to generate a respective modernization recommendation, wherein the modernization assessment report includes the respective modernization recommendation for each component of the plurality of components.

3. The computer-implemented method of claim 1, further comprising:
obtaining modernization training data including profile data for a plurality of software applications modernized in the past and metrics derived from a modernization tool used to modernize the plurality of software applications; and
using the modernization training data to train the ML model.

4. A computer-implemented method comprising:
receiving a request to generate a modernization recommendation for a software application identified by the request;
obtaining application profile data identifying attributes of the software application;
using attributes of the software application from the application profile data as input to a machine learning (ML) model to obtain the modernization recommendation;
providing access to a modernization assessment report that includes the modernization recommendation; and
receiving input selecting the modernization recommendation for implementation, wherein the input causes a software modernization assessment service to:
create a computing resource at a service of a cloud provider network based on the modernization recommendation, and
migrate implementation of at least a portion of the software application to the computing resource.

5. The computer-implemented method of claim 4, further comprising:
identifying a plurality of components of the software application, wherein each component of the plurality of components is associated with respective attributes in the profile data; and
for each component of the plurality of components, using the respective attributes of the component as input to a respective ML model to generate a respective modernization recommendation, wherein the modernization assessment report includes the respective modernization recommendation for each component of the plurality of components.

6. The computer-implemented method of claim 4, further comprising:
obtaining modernization training data including profile data for a plurality of software applications modernized in the past and metrics derived from a modernization tool used to modernize the plurality of software applications; and
using the modernization training data to train the ML model.

7. The computer-implemented method of claim 4, wherein the modernization recommendation identifies at least one of: migrating one or more components of the software application to resources provided by a service of a cloud provider network, refactoring source code associated with the software application, rearchitecting one or more components of the software application, rebuilding the software application, or using a modernization application tool.

8. The computer-implemented method of claim 4, further comprising causing display, by a modernization assessment service of a cloud provider network, of a web-based console including the modernization assessment report.

9. The computer-implemented method of claim 4, wherein the application profile data identifies at least one of: a type of the software application, a type of computing environments in which the software application is located, the software application's technical stack, a programming language associated with the software application, application scaling information, dynamic performance information associated with the software application, or identified anti-patterns associated with the software application.

10. The computer-implemented method of claim 4, wherein at least a portion of the application profile data is obtained from a software agent running in a user's computing environment in which the software application is located, wherein the software agent collects the at least a portion of the application profile data by analyzing the software application.

11. The computer-implemented method of claim 4, further comprising:
obtaining feedback data indicating whether a user associated with the software application implemented the modernization recommendation; and
using the feedback data to further train the ML model.

12. The computer-implemented method of claim 4, wherein the request to generate the modernization recommendations for the software application is received by the software modernization assessment service of a cloud provider network, and wherein the modernization assessment service obtains the modernization recommendation using the ML model.

13. The computer-implemented method of claim 4, wherein the ML model is a one-class or binary classifier used to identify whether the software application is similar to other software applications that used the modernization recommendation in the past.

14. The computer-implemented method of claim 4, wherein the computing resource is provided by an on-demand code execution service, and wherein migrating implementation of at least a portion of the software application to the computing resource includes refactoring the at least a portion of the software application into a microservice.

15. A system comprising:
a first one or more electronic devices to implement a modernization assessment service in a multi-tenant provider network, the modernization assessment service including instructions that upon execution cause the modernization assessment service to:
receive a request to generate a modernization recommendation for a software application identified by the request,
obtain application profile data identifying attributes of the software application, wherein at least a portion of the application profile data is collected by a software agent running in a user's computing environment in which the software application is located,
use attributes of the software application from the application profile data as input to a machine learning (ML) model to obtain a modernization recommendation,
provide access to a modernization assessment report that includes the modernization recommendation,
receive input selecting the modernization recommendation for implementation, wherein the input causes the modernization assessment service to:
create a computing resource at a service of the multi-tenant provider network based on the modernization recommendation, and
migrate implementation of at least a portion of the software application to the computing resource; and a second one or more electronic devices to implement the software agent, the software agent including instructions that upon execution cause the software agent to:
analyze the software application, and
generate at least a portion of the application profile data based on the analysis of the software application.

16. The system of claim 15, wherein the modernization assessment service further includes instructions that upon execution cause the modernization assessment service to:
identify a plurality of components of the software application, wherein each component of the plurality of components is associated with respective attributes in the profile data; and
for each component of the plurality of components, use the respective attributes of the component as input to a respective ML model to generate a respective modernization recommendation, wherein the modernization assessment report includes the respective modernization recommendation for each component of the plurality of components.

17. The system of claim 15, wherein the modernization assessment service further includes instructions that upon execution cause the modernization assessment service to:
obtain modernization training data including profile data for a plurality of software applications modernized in the past and metrics derived from a modernization tool used to modernize the plurality of software applications; and
use the modernization training data to train the ML model.

18. The system of claim 15, wherein the modernization recommendation identifies at least one of: migrating one or more components of the software application to resources provided by a service of the multi-tenant provider network, refactoring source code associated with the software application, rearchitecting one or more components of the software application, rebuilding the software application, or using a modernization application tool.

19. The system of claim 15, wherein the application profile data identifies at least one of: a type of the software application, a type of computing environments in which the software application is located, the software application's technical stack, a programming language associated with the software application, application scaling information, dynamic performance information associated with the software application, or identified anti-patterns associated with the software application.

20. The system of claim 15, wherein the computing resource is provided by an on-demand code execution service, and wherein migrating implementation of at least a portion of the software application to the computing resource includes refactoring the at least a portion of the software application into a microservice.

* * * * *